Figure 1:
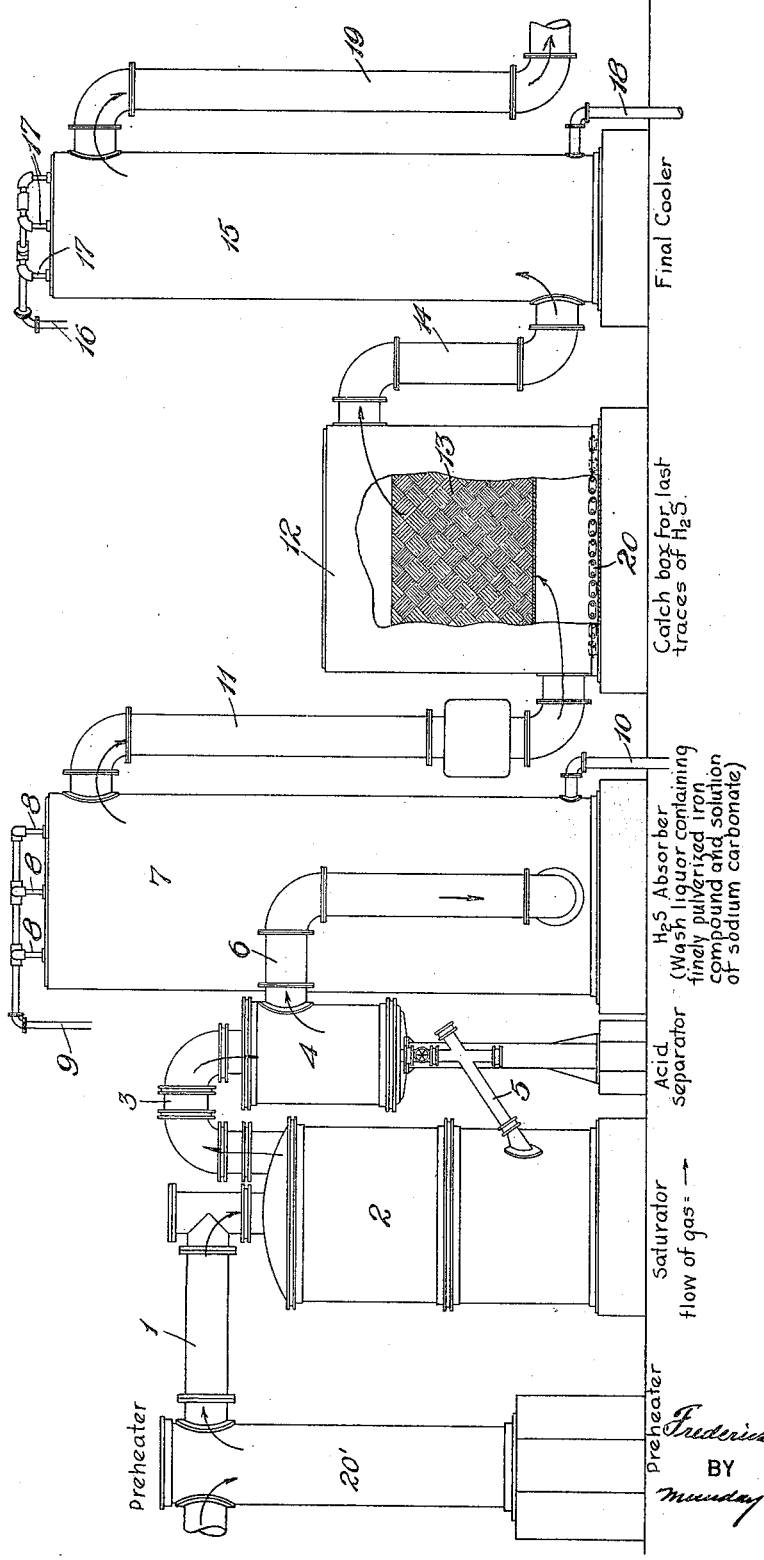

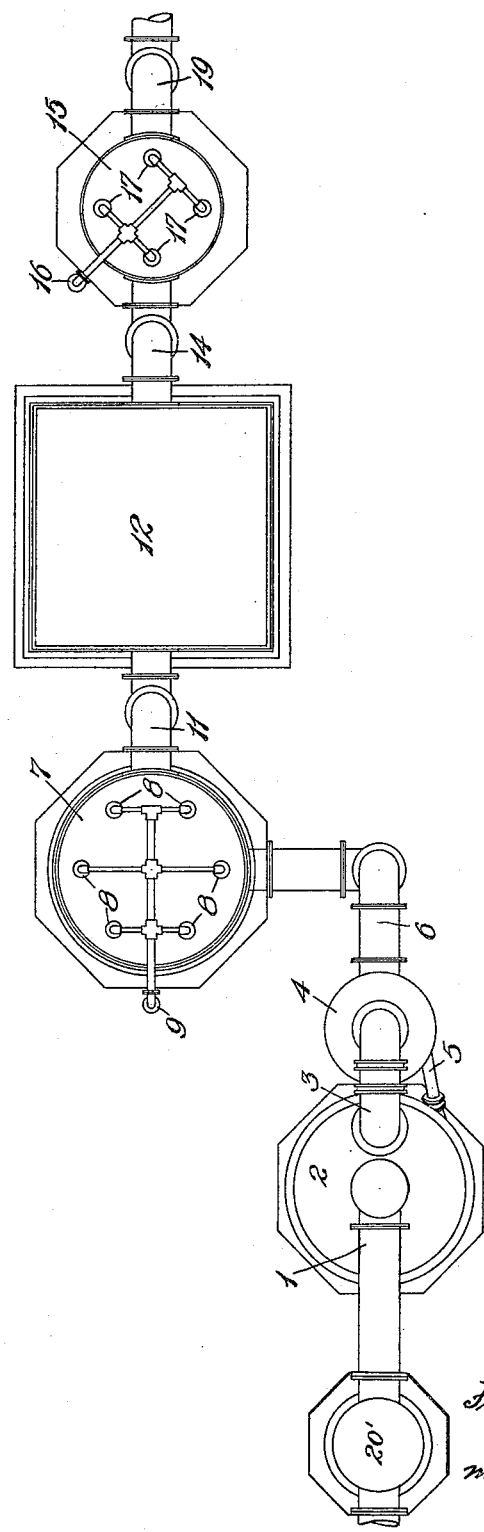

Patented Sept. 20, 1932

1,878,609

UNITED STATES PATENT OFFICE

FREDERICK W. SPERR, JR., OF PITTSBURGH, PENNSYLVANIA, ASSIGNOR TO THE KOPPERS COMPANY, OF PITTSBURGH, PENNSYLVANIA, A CORPORATION OF PENNSYLVANIA

GAS PURIFICATION PROCESS

Application filed October 6, 1925. Serial No. 60,870.

This invention relates to the purification of gas from hydrogen sulphide, and more particularly to the liquid purification of gases from which the ammonia has been removed by the direct process, and an object of this invention is to utilize the high temperature of the gas incidental to the direct process of ammonia recovery to promote the subsequent purification of the said gas.

In the treatment of by-product coke oven gases for the recovery of ammonia, the so-called "direct" process is employed in the great majority of cases. In this country, most of the direct process plants employ the Koppers process which is described in principle in the United States Patent No. 12,971, re-issued June 8, 1909.

All types of direct processes are characterized by the fact that the gas, freed as much as is possible from tarry matter and containing ammonia, is passed through sulphuric acid, with resultant formation of ammonium sulphate. This reaction usually takes place in a vessel called a saturator. The gas entering the saturator is usually heated in a suitable apparatus to a temperature of about 50° to 60° C. and the reactions occurring in the saturator serve to maintain it at a relatively high temperature. This generally necessitates cooling the gas after it passes out of the saturator and this cooling is accomplished in an apparatus known as the final cooler, wherein the gas is usually cooled by direct contact with cold water. After passing through the final cooler, the gas is usually conducted to purifiers in which the hydrogen sulphide and hydrocyanic acid are removed.

In the co-pending application of Frederick W. Sperr, Jr., Serial No. 21,983 filed April 9, 1925, it is shown that in processes for the liquid purification of coal gas employing a suspension of an iron compound in an alkaline solution, it is highly advantageous to maintain the temperature of the liquid entering the washing stage at not less than 85° F. (approximately 30° C.). When cool gases are to be purified as above, it is therefore necessary to install means for heating the liquid, as described in application Serial No. 21,983.

The present invention provides means for purifying the gas immediately subsequent to the removal of ammonia in the saturator, whereby the heat of reaction in the latter, which has been in part transferred to the gas stream, is utilized to maintain the temperature in the absorbing tower above 85° F., as specified in application No. 21,983, and thereby eliminating the apparatus necessary in the said application for heating the purification liquid.

The invention further consists in such other new and useful improvements, and has for further objects such other operative advantages or results, as may be found to obtain in the processes and apparatus hereinafter described or claimed.

In the accompanying drawings forming a part of this specification and showing for purposes of exemplification a preferred form and manner in which the invention may be embodied and practiced, but without limiting the claimed invention specifically to such illustrative instance or instances:

Figure 1 is an elevational view of preferred form of apparatus for liquid purification of gas, including a portion of the apparatus for the recovery of ammonia and the apparatus for finally cooling the purified gas; and Fig. 2 is a plan view of the apparatus shown in Fig. 1.

The same characters of reference designate the same parts in each of the two views.

The gas, such as coke oven gas, freed of substantially all tarry matter, and containing ammonia, after being heated in the heater 20', enters the saturator 2 through the inlet pipe 1, and bubbles through a bath of sulphuric acid within the saturator. The ammonia carried by the gas is thereby converted to ammonium sulphate, which accumulates in the saturator, and is occasionally removed by an ejector, to be dried. The saturator may be of the usual (Koppers) type, as shown, or any other type known in the art. The warm ammonia-free gas passes from the saturator 2 through the lead-lined pipe 3 into the acid separator 4 which collects any acid which may have been entrained by the gas stream, and returns it to the saturator through the acid return line 5. The still warm gas now passes through pipe 6 to the absorber tower 7, wherein purification of the said gas is to be effected.

The tower 7 wherein is accomplished the absorption stage of the liquid purification process, is preferably of cylindrical configuration, and is filled with means whereby intimate and thorough contact between the gas and the purifying liquid may be effected: for example, the devices shown in co-pending application of Frederick W. Sperr, Jr., Serial No. 21,980, filed April 9, 1925. Said application discloses a gas and liquid contact apparatus comprising a body or tower containing a filler presenting multitude of openings for the flow of media, and comprising successive strata of distributive and contact filler, the former being composed of elements having surfaces oblique to the flow and the latter composed of elements having surfaces parallel to the flow, of the said media. In accordance with the co-pending application Serial No. 21,983, an alkaline suspension of a finely pulverized iron compound (for example, a 1.0% suspension of ferric oxide in a 3.0% solution of sodium carbonate) is introduced into the absorber 7 through the sprays 8. However, in this modification, the said suspension has not been preheated, but the heat required in the cycle is furnished by the warm gas coming directly from the saturator. This gas from the saturator usually has a temperature of approximately 120° F. Thus the suspension, or as I shall say henceforth, the solution passes downward through the tower countercurrent to the gas flow, and during its contact with the said gas, absorbs substantially all of the hydrogen sulphide content as well as a portion of the sensible heat of the latter. Furthermore, slight traces of sulphuric acid, which may have escaped the saturator and separator, are absorbed in the alkaline solution, thus preventing corrosion of mains or other apparatus subsequent to the absorber. The fouled solution is removed from the absorber 7 through the line 10, and is pumped to an aeration tank or thionizer, such as that shown in application Serial No. 21,983, for revivification. The revivified solution from which the sulphur has been removed is pumped through the line 9 and sprays 8 into the absorber 7; the heater provided in application Serial No. 21,983 is now unnecessary. It is preferable to maintain conditions of gas and solution flow so that the fouled solution leaves the absorption stage at a temperature not less than 85° F.

The gas from which most of the hydrogen sulphide has been removed, flows through pipe 11 into the catch box 12. The latter is simply an arrangement whereby the gas may be passed at relatively low velocity through a bed of moist iron oxide 13; any traces of hydrogen sulphide that may have escaped absorption are therein removed. Steam coils 20 are provided to maintain a sufficiently high temperature when necessary to prevent undue condensation of moisture in the catch box 12, and thus prevent clogging of the same. The substantially completely purified gas now passes through pipe 14 into the final cooler 15, the function of which is to remove naphthalene and reduce the dew point of the gas to such a point that it will give no trouble in subsequent handling. This is accomplished by means of cold water introduced through the sprays 17 from the line 16; warm water is removed through the line 18. The cool gas flows out through pipe 19 into the mains or storage facilities.

Under ordinary conditions substantially complete purification of the gas is obtained in the absorber 7, and the catch box 12 is merely a safety provision which may be omitted when desired.

According to the invention as above described, the sensible heat of the gas incidental to direct ammonium sulphate recovery is utilized to promote subsequent purification, and thus represents a saving in equipment and cost of operation over systems not so advantageously arranged.

The invention as hereinabove set forth is embodied in a particular form but may be variously embodied within the scope of the claims hereinafter made.

I claim:

1. In the treatment of gas from coke ovens the improvement which consists in: passing the gas through sulphuric acid to remove ammonia from the gas as ammonium sulphate; purifying the ammonia-freed gas of hydrogen sulphide by washing it with a solution to remove hydrogen sulphide therefrom; and promoting such purification with heat by effecting such washing of the gas while it is still relatively hot due to the heat imparted to it as an incident of the direct recovery of ammonium sulphate therefrom.

2. A process of treating gas containing ammonia and hydrogen sulphide which comprises passing the gas through sulphuric acid to effect the direct recovery of ammonia as ammonium sulphate, purifying the still hot gas of hydrogen sulphide by contact with a solution immediately subsequent to the said ammonia recovery and further cooling the purified gas.

3. A process of treating gas containing ammonia and hydrogen sulphide which comprises heating the gas to prepare it for the direct recovery of ammonium sulphate, passing the heated gas through a bath of sulphuric acid to directly recover the ammonia as ammonium sulphate, purifying the hot gas of hydrogen sulphide after the recovery of ammonium sulphate and while retaining the heat of reaction from ammonium sulphate recovery by washing the gas with a gas purifying solution immediately subsequent to the said recovery and further cooling the purified gas.

4. A process for treating gas which comprises heating the gas prior to the direct recovery of ammonium sulphate, passing the gas through sulphuric acid to recover the ammonia from the gas as ammonium sulphate, purifying the gas of hydrogen sulphide after the recovery of ammonium sulphate by washing the gas immediately subsequent to the said recovery of ammonia, and before the gas is cooled of the heat of reaction from ammonium sulphate recovery, with a solution containing sodium carbonate and ferric oxide, and further cooling the purified gas.

5. In a process for treating coke oven gas, the combination of steps which consists in preheating the gas prior to ammonia recovery, then passing the heated gas through a sulphuric acid bath to remove the ammonia as ammonium sulphate, then washing the gas immediately after it leaves the sulphuric acid bath, and before cooling, and while still at a relatively high temperature, with an alkaline solution containing a compound of a metal whose sulphide is insoluble, to remove hydrogen sulphide from the gas, then further cooling the gas.

6. A process as claimed in claim 5 in which the alkaline solution is a sodium carbonate solution and in which the compound of a metal whose sulphide is insoluble in ferric oxide.

7. In a process for the treatment of fuel gases containing ammonia and hydrogen sulphide, the combination of the following steps in sequence: heating the gas; then passing the gas through sulphuric acid to recover the ammonia as ammonium sulphate; then purifying the ammonia-freed gas of hydrogen sulphide while still relatively hot by washing the gas with a continuously flowing alkaline solution containing an iron compound; and then finally cooling the purified gas.

8. A process of treating gas containing ammonia and hydrogen sulphide which comprises passing the gas through sulphuric acid to recover the ammonia from the gas as ammonium sulphate, and purifying the still hot gas by contact with an alkaline solution immediately subsequent to the said ammonia recovery.

9. In the treatment of gas containing ammonia and hydrogen sulphide the improvement which comprises effecting liquid purification of said gas of hydrogen sulphide immediately subsequent to direct recovery of ammonium sulphate therefrom and promoting such liquid purification of the gas by immediate and direct contact of the purifying liquid with the gas while the gas contains the sensible heat imparted thereto as an incident to direct recovery of ammonium sulphate therefrom.

10. A process of treating gas containing ammonia and hydrogen sulphide which comprises: heating the gas to prepare it for the direct recovery of ammonium compound crystals; passing the heated gas through an acid saturation bath to directly recover the ammonia as ammonium compound crystals; and purifying the hot gas of hydrogen sulphide and cooling it after the recovery of ammonium compound crystals by washing the gas immediately subsequent to said recovery of ammonia, and before the gas is cooled of the heat of reaction from ammonium compound crystal recovery, with a gas purifying solution.

In testimony whereof I have hereunto set my hand.

FREDERICK W. SPERR, Jr.